(12) United States Patent
Kiyota et al.

(10) Patent No.: US 12,546,017 B2
(45) Date of Patent: Feb. 10, 2026

(54) CARBON DIOXIDE ELECTROLYTIC DEVICE AND METHOD OF CONTROLLING CARBON DIOXIDE ELECTROLYTIC DEVICE

(71) Applicant: KABUSHIKI KAISHA TOSHIBA, Tokyo (JP)

(72) Inventors: Yasuhiro Kiyota, Itabashi (JP); Hyangmi Jung, Yokohama (JP); Yuki Kudo, Yokohama (JP); Satoshi Mikoshiba, Yamato (JP); Ryota Kitagawa, Setagaya (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 768 days.

(21) Appl. No.: 17/821,828

(22) Filed: Aug. 24, 2022

(65) Prior Publication Data
US 2023/0295812 A1  Sep. 21, 2023

(30) Foreign Application Priority Data

Mar. 15, 2022  (JP) .................................. 2022-040387

(51) Int. Cl.
*C25B 1/23* (2021.01)
*C25B 3/07* (2021.01)
(Continued)

(52) U.S. Cl.
CPC .................. *C25B 1/23* (2021.01); *C25B 3/07* (2021.01); *C25B 3/26* (2021.01); *C25B 9/19* (2021.01);
(Continued)

(58) Field of Classification Search
CPC .... C25B 1/23; C25B 3/07; C25B 3/26; C25B 9/19; C25B 9/65; C25B 13/00;
(Continued)

(56) References Cited

U.S. PATENT DOCUMENTS 8,858,777 B2 *  10/2014  Kaczur ................... C25B 15/00
                                                     205/555
12,006,580 B2 *  6/2024  Berlinguette ......... C25B 11/081
(Continued)

FOREIGN PATENT DOCUMENTS

JP    2010-64067 A    3/2010
JP    2012-125761 A   7/2012
(Continued)

OTHER PUBLICATIONS

Office Action issued Oct. 15, 2024, in corresponding Japanese Patent Application No. 2022-040387 (with English Translation), 6 pages.

(Continued)

*Primary Examiner* — Bryan D. Ripa
(74) *Attorney, Agent, or Firm* — Oblon, McClelland, Maier & Neustadt, L.L.P.

(57) ABSTRACT

A carbon dioxide electrolytic device includes: a carbon dioxide electrolysis cell having a cathode and an anode flow path, a cathode, an anode, and a first diaphragm; a first current regulator to supply a first current; a first gas/liquid separator to separate a first fluid from the anode flow path into a first liquid and gas; an electrodialysis cell having, first and second electrodes, first to fourth rooms, and second to fourth diaphragms; a second current regulator to supply a second current; at least one detector out of a first detector to detect a flow rate of the first gas or a concentration of carbon dioxide in the first gas, and a second detector to detect a pH or a concentration of at least one ion in the first fluid; and a first controller to regulate a second current, in accordance with at least one detection signal.

8 Claims, 8 Drawing Sheets

(51) Int. Cl.
*C25B 3/26* (2021.01)
*C25B 9/19* (2021.01)
*C25B 9/65* (2021.01)
*C25B 13/00* (2006.01)
*C25B 15/029* (2021.01)

(52) U.S. Cl.
CPC ............... *C25B 9/65* (2021.01); *C25B 13/00* (2013.01); *C25B 15/029* (2021.01)

(58) Field of Classification Search
CPC ....... C25B 15/029; C25B 15/031; C25B 3/03; C25B 15/02; C25B 15/023; C25B 15/08; Y02E 60/36; B01D 61/423; B01D 61/445; B01D 61/463; B01D 61/465; B01D 2311/04; B01D 61/422; B01D 61/466; B01D 2311/2684
See application file for complete search history.

(56) References Cited

U.S. PATENT DOCUMENTS

| | | | | |
|---|---|---|---|---|
| 2019/0127865 A1* | 5/2019 | Li | ............................. | C25B 3/26 |
| 2019/0193025 A1* | 6/2019 | Kato | ..................... | B01D 53/78 |
| 2020/0087233 A1* | 3/2020 | Ono | ........................ | C25B 9/73 |
| 2021/0079542 A1 | 3/2021 | Kitagawa et al. | | |
| 2021/0095381 A1* | 4/2021 | Tsujiuchi | ........... | B01D 53/1431 |
| 2021/0285111 A1* | 9/2021 | Fernández Sanchis | ... | C25B 1/00 |
| 2021/0292925 A1* | 9/2021 | Mikoshiba | ................ | C25B 9/19 |
| 2022/0064808 A1* | 3/2022 | Ono | ..................... | C25B 11/031 |
| 2022/0136119 A1* | 5/2022 | Flanders | ................... | C12P 7/06 |
| | | | | 435/71.1 |
| 2022/0297077 A1* | 9/2022 | Mizuguchi | ............ | C25B 15/023 |
| 2024/0228419 A1* | 7/2024 | Goetheer | ................ | C07C 51/02 |

FOREIGN PATENT DOCUMENTS

| | | |
|---|---|---|
| JP | 2019-167557 A | 10/2019 |
| JP | 2021-46574 A | 3/2021 |
| JP | 2021-147679 A | 9/2021 |
| WO | WO 2018/059839 A1 | 4/2018 |

OTHER PUBLICATIONS

Japanese Decision to Grant a Patent issued Mar. 5, 2025 in Japanese Patent Application No. 2022-040387, (with English translation), 5 pages.

* cited by examiner

CARBON DIOXIDE ELECTROLYTIC DEVICE AND METHOD OF CONTROLLING CARBON DIOXIDE ELECTROLYTIC DEVICE

CROSS-REFERENCE TO RELATED APPLICATION

This application is based upon and claims the benefit of priority from Japanese Patent Application No. 2022-040387, filed on Mar. 15, 2022; the entire contents of which are incorporated herein by reference.

FIELD

Embodiments relate to a carbon dioxide electrolytic device, and a method of controlling a carbon dioxide electrolytic device.

BACKGROUND

In recent years, a carbon dioxide electrolytic technique, which has been focused as an attempt for decarbonization, can electrochemically reduce carbon dioxide ($CO_2$) to convert the carbon dioxide into chemical substances (chemical energies) such as carbon monoxide (CO), formic acid (HCOOH), methanol ($CH_3OH$), methane ($CH_4$), ethanol ($C_2H_5OH$), ethane ($C_2H_6$), and ethylene ($C_2H_4$). A carbon dioxide electrolysis cell having two rooms which are separated by a diaphragm, has a problem of reduction of a carbon dioxide utilization ratio caused by carbon dioxide introduced into the electrolysis cell partly moving from a cathode flow path to an anode flow path, and the moved carbon dioxide moving with an electrolytic solution to be discharged from the anode flow path.

DETAILED DESCRIPTION

A carbon dioxide electrolytic device, includes:
a carbon dioxide electrolysis cell having
a cathode flow path through which carbon dioxide flows,
an anode flow path through which an electrolytic solution containing water flows,
a cathode facing on the cathode flow path, the cathode being configured to reduce the carbon dioxide to produce a carbon compound,
an anode facing on the anode flow path, the anode being configured to oxidize the water to produce oxygen, and
a first diaphragm between the anode flow path and the cathode flow path;
a first current regulator configured to supply a first current to the carbon dioxide electrolysis cell;
a first gas/liquid separator configured to separate a first fluid to be discharged from the anode flow path into a first liquid and a first gas;
an electrodialysis cell having
a first room, a first electrode in the first room,
a second room, a second electrode in the second room,
a third room between the first room and the second room, the third room being configured to store the first liquid to be supplied from the first gas/liquid separator,
a fourth room between the third room and the second room,
a second diaphragm between the first room and the third room,
a third diaphragm between the second room and the fourth room, and
a fourth diaphragm between the third room and the fourth room;
a second current regulator configured to supply a second current to the electrodialysis cell;
at least one detector selected from the group consisting of a first detector and a second detector, the first detector being configured to detect a flow rate of the first gas or a concentration of carbon dioxide contained in the first gas, and the second detector being configured to detect a pH of the first fluid or a concentration of at least one ion contained in the first fluid; and
a first controller configured to control the second current regulator to regulate a value of the second current, in accordance with at least one detection signal from the at least one detector.

A carbon dioxide electrolytic device of an embodiment will be described hereinafter with reference to the drawings. In respective embodiments, substantially the same components are denoted by the same reference signs, and description thereof is partially omitted in some cases. The drawings are schematic, and the relationship between thicknesses of respective parts and plane dimensions, ratios between thicknesses of respective parts and the like differ from actual ones in some cases.

In the present description, the term of "connection" means not only direct connection but also indirect connection, unless otherwise stated.

First Embodiment

Figure 1:
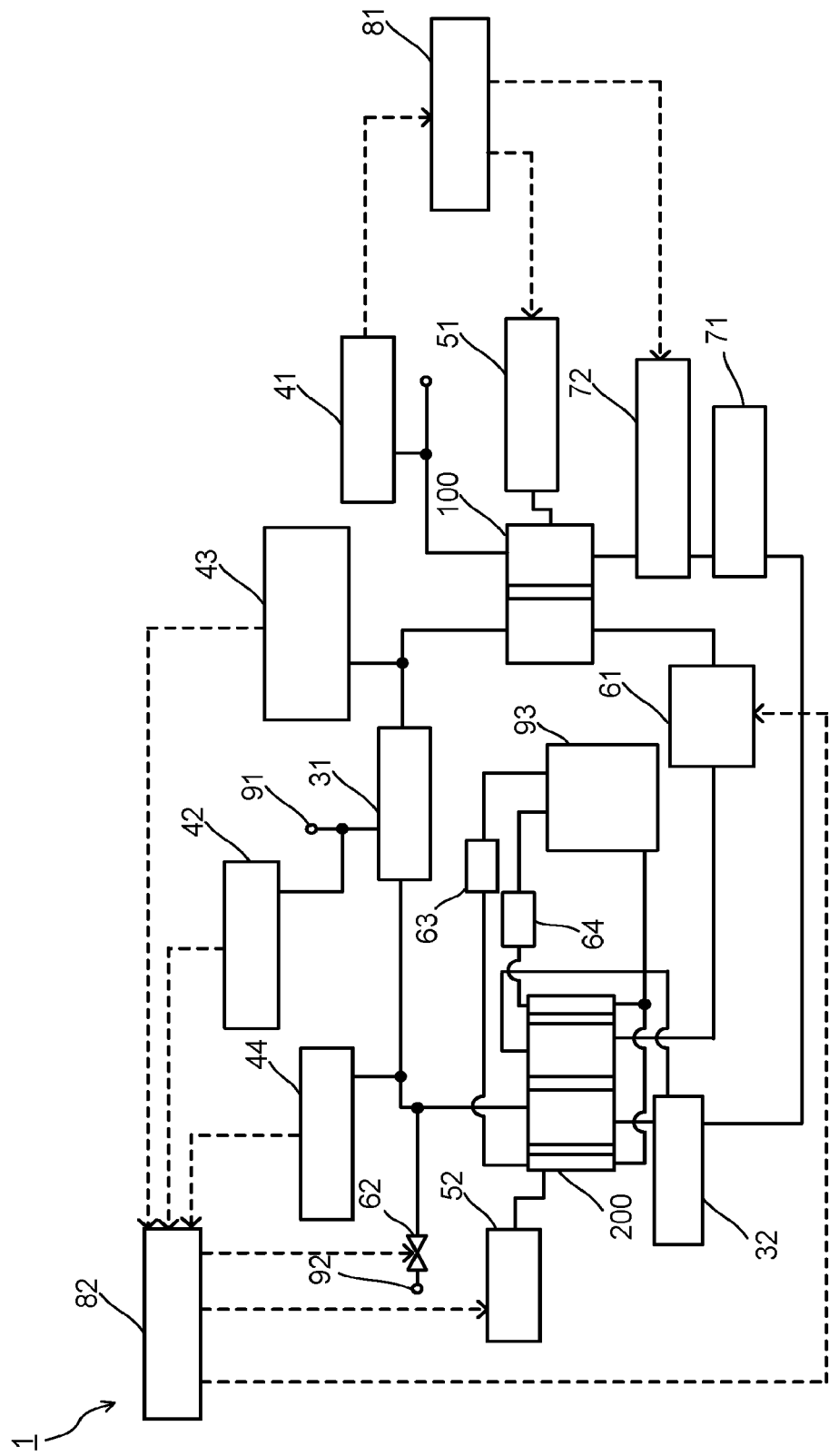
FIG. 1 is a schematic view illustrating a configuration example of a carbon dioxide electrolytic device of a first embodiment.

FIG. 1 is a view illustrating a carbon dioxide electrolytic device of a first embodiment. A carbon dioxide electrolytic device 1 illustrated in FIG. 1 includes a carbon dioxide electrolysis cell 100, an electrodialysis cell 200, a carbon dioxide detector 41, a carbon dioxide detector 42, a pH/ion concentration detector 43, a gas/liquid separator 31, a gas/liquid separator 32, a water quality detector 44, a current regulator 51 which supplies a current to the carbon dioxide electrolysis cell 100, a current regulator 52, a pump 61, a purge valve 62, a pump 63, a pump 64, a carbon dioxide supply source 71, a carbon dioxide flow rate regulator 72, a controller 81, a controller 82, and an electrolytic solution tank 93.

Figure 2:
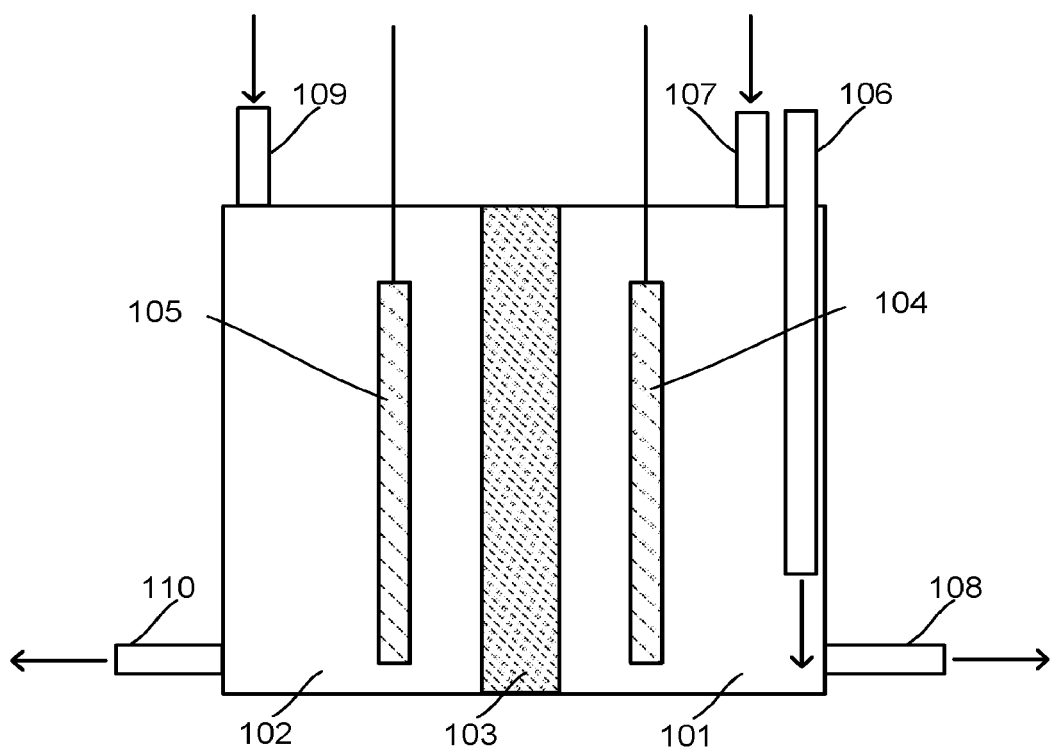
FIG. 2 is a schematic view illustrating a structural example of a carbon dioxide electrolysis cell 100 of the first embodiment.

FIG. 2 is a schematic view illustrating a structural example of the carbon dioxide electrolysis cell 100 in the first embodiment. The carbon dioxide electrolysis cell 100 illustrated in FIG. 2 includes a cathode flow path 101, an anode flow path 102, a diaphragm 103, a cathode 104, an anode 105, a supply flow path 106, a supply flow path 107, a discharge flow path 108, a supply flow path 109, and a discharge flow path 110. The respective flow paths may also be connected to pumps if necessary.

The cathode flow path 101 is provided to a first room capable of storing carbon dioxide, for example. Carbon dioxide is stored in the cathode flow path 101 as a first electrolytic solution containing the carbon dioxide, for example. The first electrolytic solution functions as a cathode solution, and contains carbon dioxide as a substance to be reduced. A state of carbon dioxide that exists in the first electrolytic solution is not required to be a gaseous state, and it may be a state of dissolved carbon dioxide, carbonate ions ($CO_3^{2-}$), hydrogen carbonate ions ($HCO_3^-$), or the like. The first electrolytic solution may contain hydrogen ions or hydroxide ions, and is preferably an aqueous solution.

The anode flow path 102 is provided to a second room capable of storing a second electrolytic solution containing water, or water vapor, for example. The second electrolytic solution functions as an anode solution, and contains water ($H_2O$), chloride ions ($Cl^-$), carbonate ions ($CO_3^{2-}$), hydrogen carbonate ions ($HCO_3^-$), and the like, for example, as a substance to be oxidized. The second electrolytic solution may be an alcohol aqueous solution, an aqueous solution of an organic substance such as amine, or the like.

A change of the amount of water and electrolytic solution components in the first and second electrolytic solutions, can change the reactivity to change the selectivity of the substance to be reduced and the proportion of the chemical substance to be produced. The first and second electrolytic solutions may contain redox couples if necessary. Examples of the redox couple include $Fe^{3+}/Fe^{2+}$ and $IO_3^-/I^-$.

The first room and the second room can be made of, for example, quartz white plate glass, an acrylic resin (PMMA), polystyrene (PS), or the like. A material transmitting light may be used for a part of the cathode flow path 101 and the anode flow path 102, and a resin material may be used for the remainder. Examples of the resin material include polyetheretherketone (PEEK), polyamide (PA), polyvinylidene fluoride (PVDF), polyacetal (POM) (copolymer), polyphenyleneether (PPE), acrylonitrile-butadiene-styrene copolymer (ABS), polypropylene (PP), polyethylene (PE), and so on. The first room and the second room may have space for storing gas contained in the reactant and the product.

Each pressure of the first and second rooms is preferably set to a pressure which does not liquefy carbon dioxide, and it is preferably regulated to fall within a range of 0.1 MPa or more and 6.4 MPa or less, for example. If the pressure in each of the rooms is less than 0.1 MPa, the reduction reaction efficiency of carbon dioxide may decrease. If the pressure in each of the rooms exceeds 6.4 MPa, carbon dioxide is liquefied, and the reduction reaction efficiency of carbon dioxide may decrease. A differential pressure between the first and second rooms may cause breakage or the like of the diaphragm 103. For this reason, the difference between the pressure in the first room and the pressure in the second room (differential pressure) is preferably set to 1 MPa or less.

The lower temperature of the electrolytic solution increases the amount of dissolution of carbon dioxide, but the lower temperature has disadvantage for carbon dioxide electrolysis because of an increase of a solution resistance and an increase of a theoretical voltage of the reaction. On the other hand, the higher temperature of the electrolytic solution has advantage in carbon dioxide electrolysis although the amount of dissolution of carbon dioxide decreases. For the reason, a working temperature condition of the carbon dioxide electrolysis cell 100 is preferably in a middle temperature region, for example, in a range of an atmospheric temperature or more and equal to or less than a boiling point of the electrolytic solution. When the electrolytic solution is an aqueous solution, the working temperature condition is preferably 10° C. or more and 100° C. or less, and more preferably 25° C. or more and 80° C. or less. When the raw material gas containing carbon dioxide is filled in the cathode flow path 101 and water vapor is filled in the anode flow path 102, the device can operates at a higher temperature. In that case, the working temperature is decided based on heat resistance of a member such as the diaphragm 103. When the diaphragm 103 is an ion exchange membrane or the like, the working temperature is 180° C. at the maximum, and when it is a polymer porous membrane such as Teflon (registered trademark), the maximum temperature becomes 300° C. The first electrolytic solution and the second electrolytic solution may be electrolytic solutions containing different substances or may be electrolytic solutions containing the same substance. When the first electrolytic solution and the second electrolytic solution contain the same substance and the same solvent, the first electrolytic solution and the second electrolytic solution may be regarded as one electrolytic solution. The pH of the first electrolytic solution may be higher than the pH of the second electrolytic solution. This enables ions such as hydrogen ions and hydroxide ions easy to move through the diaphragm 103. Further, the liquid junction potential due to the difference in pH can effectively promote the oxidation-reduction reaction.

The first electrolytic solution is preferably a solution with high absorptance of carbon dioxide. The existing form of carbon dioxide in the first electrolytic solution is not always limited to a state of being dissolved therein, and carbon dioxide in an air bubble state may exist by being mixed in the first electrolytic solution. Examples of the electrolytic solution containing carbon dioxide, include aqueous solutions containing hydrogencarbonates and carbonates such as lithium hydrogen carbonate ($LiHCO_3^-$), sodium hydrogen carbonate ($NaHCO_3$), potassium hydrogen carbonate ($KHCO_3^-$), cesium hydrogen carbonate ($CsHCO_3^-$), sodium carbonate ($Na_2CO_3$), and potassium carbonate ($K_2CO_3$), phosphoric acid, boric acid, and so on. The electrolytic solution containing carbon dioxide may contain alcohols such as methanol, ethanol, and acetone, or may be an alcohol solution. The first electrolytic solution may be an electrolytic solution containing a carbon dioxide absorbent that lowers the reduction potential for carbon dioxide, has high ion conductivity, and absorbs carbon dioxide.

Examples of the second electrolytic solution include a solution using water ($H_2O$), for example, an aqueous solution containing an arbitrary electrolyte. This solution is preferably an aqueous solution that promotes the oxidation reaction of water. Examples of the aqueous solution containing the electrolyte, include aqueous solutions containing phosphate ion ($PO_4^{2-}$), borate ion ($BO_3^{3-}$), hydrogen ion ($H^+$), sodium ion ($Na^+$), potassium ion ($K^+$), calcium ion ($Ca_2^+$), lithium ion ($Li^+$), cesium ion ($Cs^+$), magnesium ion ($Mg_2^+$), chloride ion ($Cl^-$), hydrogen carbonate ion ($HCO_3^-$), carbonate ion ($CO_3^-$), hydroxide ion ($OH^-$), and the like.

Examples of the electrolytic solutions, include ionic liquids made of salts of cations such as imidazolium ions or pyridinium ions and anions such as $BF_4^-$ or $PF_6^-$ and in a liquid state in a wide temperature range, or aqueous solutions thereof. Further, examples of other electrolytic solutions, include amine solutions such as ethanolamine, imidazole, and pyridine, or aqueous solutions thereof. Examples of amine include primary amine, secondary amine, tertiary amine, and so on. These electrolytic solutions may be high in ion conductivity and have properties of absorbing carbon dioxide and characteristics of lowering the reduction energy.

Examples of the primary amine include methylamine, ethylamine, propylamine, butylamine, pentylamine, hexylamine, and the like. Hydrocarbons of the amine may be substituted by alcohol, halogen, and the like. Examples of amine whose hydrocarbons are substituted, include methanolamine, ethanolamine, chloromethylamine, and the like. Further, an unsaturated bond may exist. These hydrocarbons are also the same in the secondary amine and the tertiary amine.

Examples of the secondary amine include dimethylamine, diethylamine, dipropylamine, dibutylamine, dipentylamine, dihexylamine, dimethanolamine, diethanolamine, dipropanolamine, and the like. The substituted hydrocarbons may be different. This also applies to the tertiary amine. Examples with different hydrocarbons include methylethylamine, methylpropylamine, and the like.

Examples of the tertiary amine include trimethylamine, triethylamine, tripropylamine, tributylamine, trihexylamine, trimethanolamine, triethanolamine, tripropanolamine, tributanolamine, triexanolamine, methyldiethylamine, methyldipropylamine, and the like.

Examples of the cation of the ionic liquid include 1-ethyl-3-methylimidazolium ion, 1-methyl-3-propylimidazolium ion, 1-butyl-3-methylimidazole ion, 1-methyl-3-pentylimidazolium ion, 1-hexyl-3-methylimidazolium ion, and the like.

A second place of the imidazolium ion may be substituted. Examples of the cation of the imidazolium ion whose second place is substituted, include 1-ethyl-2,3-dimethylimidazolium ion, 1,2-dimethyl-3-propylimidazolium ion, 1-butyl-2,3-dimethylimidazolium ion, 1,2-dimethyl-3-pentylimidazolium ion, 1-hexyl-2,3-dimethylimidazolium ion, and the like.

Examples of the pyridinium ion include methylpyridinium, ethylpyridinium, propylpyridinium, butylpyridinium, pentylpyridinium, hexylpyridinium, and the like. In both of the imidazolium ion and the pyridinium ion, an alkyl group may be substituted, or an unsaturated bond may exist.

Examples of the anion include fluoride ion ($F^-$), chloride ion ($Cl^-$), bromide ion ($Br^-$), iodide ion ($I^-$), $BF_4^-$, $PF_6^-$, $CF_3COO^-$, $CF_3SO_3^-$, $NO_3^-$, $SCN^-$, $(CF_3SO_2)_3C^-$, bis(trifluoromethoxysulfonyl)imide, bis(trifluoromethoxysulfonyl)imide, bis(perfluoroethylsulfonyl)imide, and the like. Dipolar ions in which the cations and the anions of the ionic liquid are coupled by hydrocarbons may be used. A buffer solution such as a potassium phosphate solution may be supplied to the cathode flow path 101 and the anode flow path 102.

The diaphragm 103 is provided between the cathode flow path 101 and the anode flow path 102, and partitions between the cathode flow path 101 and the anode flow path 102. The diaphragm 103 allows ions such as hydrogen ions ($H^+$), hydroxide ions ($OH^-$), carbonate ions ($CO_2^-$), and hydrogen carbonate ions ($HCO_3^-$) to move therethrough.

Examples of the diaphragm 103 include a membrane capable of selectively allowing the anion or the cation to pass therethrough. This enables the electrolytic solutions on the cathode 104 and the anode 105 to contain substances different from each other, resulting in a promotion of the reduction reaction and the oxidation reaction depending on the difference in ionic strength, the difference in pH or the like. The first electrolytic solution and the second electrolytic solution can be separated by using the diaphragm 103. The diaphragm 103 may have a function of allowing a part of ions contained in the electrolytic solutions in which both electrodes are immersed to be transmitted therethrough, namely, a function of blocking one or more kinds of ions contained in the electrolytic solutions. Accordingly, for example, the two electrolytic solutions can have different pHs.

Examples of the diaphragm 103 include an ion exchange membrane such as NEOSEPTA (registered trademark) of ASTOM Corporation, Selemion (registered trademark), Aciplex (registered trademark) of ASAHI GLASS CO., LTD., Fumasep (registered trademark), fumapem (registered trademark) of Fumatech GmbH, Nafion (registered trademark) being fluorocarbon resin made by sulfonating and polymerizing tetrafluoroethylene of E.I. du Pont de Nemours and Company, lewabrane (registered trademark) of LANXESS AG, IONSEP (registered trademark) of IONTECH Inc., Mustang (registered trademark) of PALL Corporation, ralex (registered trademark) of mega Corporation, or Gore-Tex (registered trademark) of Gore-Tex Co., Ltd. can be used. The ion exchange membrane may be composed by using a membrane having hydrocarbon as a basic skeleton or a membrane having an amine group in anion exchange. When the first electrolytic solution and the second electrolytic solution are different in pH, the electrolytic solutions can be used while stably keeping their pHs by using a bipolar membrane made by stacking a cation exchange membrane and an anion exchange membrane.

Other than the ion exchange membrane, for example, porous membranes of a silicone resin, fluorine-based resins (perfluoroalkoxyalkane (PFA), perfluoroethylene propene copolymer (FEP), polytetrafluoroethylene (PTFE), ethylene-tetrafluoroethylene copolymer (ETFE), polyvinylidene fluoride (PVDF), polychlorotrifluoroethylene (PCTFE), and ethylene-chlorotrifluoroethylene copolymer (ECTFE)), polyethersulfone (PES) and the like, and ceramics, packing filled with glass filter, agar, and the like, insulating porous bodies of zeolite and oxide and the like may be used as the diaphragm 103. In particular, a hydrophilic porous membrane never causes clogging due to air bubbles, so that it is preferable as the diaphragm 103.

The cathode 104 faces on the cathode flow path 101. The cathode 104 is an electrode (reduction electrode) that reduces carbon dioxide to produce a carbon compound. The cathode 104 is arranged in the first room and immersed in the first electrolytic solution. The cathode 104 contains a reduction catalyst for producing the carbon compound by the reduction reaction of, for example, carbon dioxide. Examples of the reduction catalyst include a material that lowers activation energy for reducing carbon dioxide. In other words, examples of the reduction catalyst include a material that lowers an overvoltage when the carbon compound is produced by the reduction reaction of carbon dioxide.

Examples of the cathode 104 include a metal material or a carbon material. Examples of the metal material include a metal such as gold, aluminum, copper, silver, platinum, palladium, zinc, mercury, indium, nickel, or titanium, an alloy containing the metal, or the like. Examples of the carbon material include graphene, carbon nanotube (CNT), fullerene, ketjen black, or the like. The reduction catalyst is not limited to the above, and examples of the reduction catalyst may include a metal complex such as a Ru complex or a Re complex, or an organic molecule having an imidazole skeleton or a pyridine skeleton. The reduction catalyst may be a mixture of a plurality of materials. The cathode 104 may have, for example, a structure having the reduction catalyst in a thin film shape, a mesh shape, a particle shape, a wire shape, or the like provided on a conductive substrate.

The carbon compound produced by the reduction reaction in the cathode 104 differs depending on the kind or the like of the reduction catalyst, and examples thereof include carbon monoxide (CO), formic acid (HCOOH), methane ($CH_4$), methanol ($CH_3OH$), ethane ($C_2H_6$), ethylene ($C_2H_4$), ethanol ($C_2H_5OH$), formaldehyde (HCHO), ethylene glycol ($C_2H_6O_2$), and so on. Further, in the cathode, a side reaction of generating hydrogen ($H_2$) may occur at the same time with the reduction reaction of carbon dioxide ($CO_2$).

The anode 105 faces on the anode flow path 102. The anode 105 is an electrode (oxidation electrode) that oxidizes a substance to be oxidized such as a substance, ions, and so on in the second electrolytic solution. For example, the anode 105 oxidizes water to produce oxygen or hydrogen peroxide solution, or it oxidizes chloride ions ($Cl^-$) to produce chlorine. The anode 105 is arranged in the second room, and immersed in the second electrolytic solution. The anode 105 contains an oxidation catalyst for the substance to be oxidized. Examples of the oxidation catalyst include a material that lowers activation energy when oxidizing the substance to be oxidized, in other words, a material that lowers a reaction overvoltage.

Examples of the oxidation catalyst include metals such as ruthenium, iridium, platinum, cobalt, nickel, iron, and manganese. Further, examples of the oxidation catalyst include a binary metal oxide, a ternary metal oxide, a quaternary metal oxide, or the like. Examples of the binary metal oxide include manganese oxide (Mn—O), iridium oxide (Ir—O), nickel oxide (Ni—O), cobalt oxide (Co—O), iron oxide (Fe—O), tin oxide (Sn—O), indium oxide (In—O), ruthenium oxide (Ru—O), and the like. Examples of the ternary metal oxide include Ni—Fe—O, Ni—Co—O, La—Co—O, Ni—La—O, Sr—Fe—O, and the like. Examples of the quaternary metal oxide include Pb—Ru—Ir—O, La—Sr—Co—O, and the like. The oxidation catalyst is not limited to the above, and examples of the oxidation catalyst may include a metal hydroxide containing cobalt, nickel, iron, manganese, or the like, or a metal complex such as a Ru complex or a Fe complex. Further, a plurality of materials may be mixed to be used.

The anode 105 may be composed of a composite material containing both the oxidation catalyst and a conductive material. Examples of the conductive material include: carbon materials such as carbon black, activated carbon, fullerene, carbon nanotube, graphene, ketjen black, and diamond; transparent conductive oxides such as indium tin oxide (ITO), zinc oxide (ZnO), fluorine-doped tin oxide (FTO), aluminum-doped zinc oxide (AZO), and antimony-doped tin oxide (ATO); metals such as Cu, Al, Ti, Ni, Ag, W, Co, and Au; and alloys each containing at least one of the metals. The anode 105 may have, for example, a structure having the oxidation catalyst in a thin film shape, a mesh shape, a particle shape, a wire shape, or the like provided on a conductive substrate. Examples of the conductive substrate include a metal material containing titanium, titanium alloy, and stainless steel.

The supply flow path 106 is connected to the cathode flow path 101. The carbon dioxide electrolysis cell 100 can supply a raw material gas containing carbon dioxide from the supply flow path 106 to the cathode flow path 101. Although the supply flow path 106 illustrated in FIG. 2 extends inside the cathode flow path 101, a position of the supply flow path 106 is not limited to the position illustrated in FIG. 2.

The supply flow path 107 is connected to the cathode flow path 101. The carbon dioxide electrolysis cell 100 can supply the first electrolytic solution to the first room through the supply flow path 107.

The discharge flow path 108 is connected to the cathode flow path 101. The carbon dioxide electrolysis cell 100 can discharge a fluid containing a reactive gas and the first electrolytic solution from the cathode flow path 101 through the discharge flow path 108.

The supply flow path 109 is connected to the anode flow path 102. The carbon dioxide electrolysis cell 100 can supply the second electrolytic solution to the anode flow path 102 through the supply flow path 109.

The discharge flow path 110 is connected to the anode flow path 102. The carbon dioxide electrolysis cell 100 can discharge a fluid containing a reactive gas and the second electrolytic solution from the anode flow path 102 through the discharge flow path 110.

Figure 3:
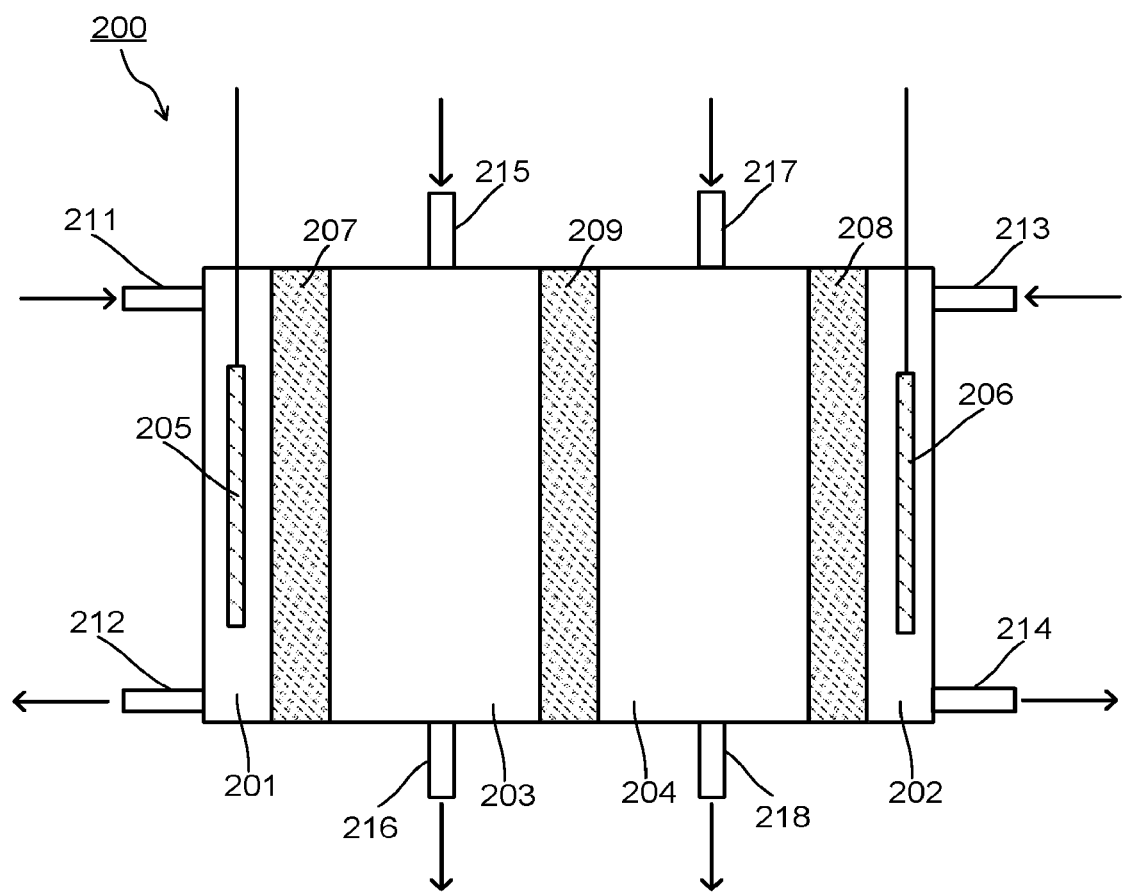
FIG. 3 is a schematic view illustrating a structural example of an electrodialysis cell.
Figure 4:
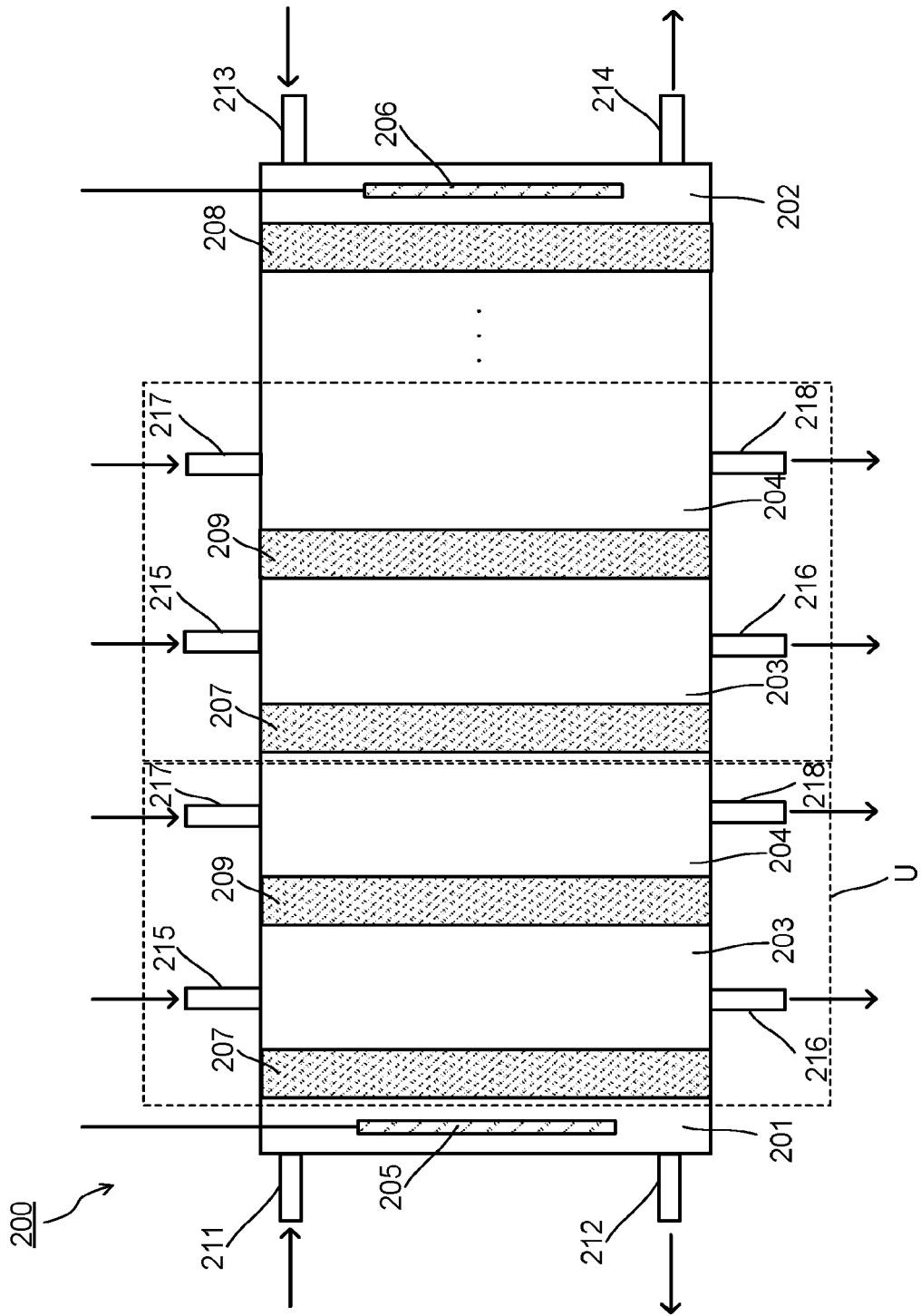
FIG. 4 is a schematic view illustrating another structural example of the electrodialysis cell.

Each of FIG. 3 and FIG. 4 is a schematic view illustrating a structural example of the electrodialysis cell 200. The electrodialysis cell 200 illustrated in FIG. 3 includes an room 201, an room 202, an room 203, an room 204, an electrode 205, an electrode 206, a diaphragm 207, a diaphragm 208, a diaphragm 209, a supply flow path 211, a discharge flow path 212, a supply flow path 213, a discharge flow path 214, a supply flow path 215, a discharge flow path 216, a supply flow path 217, and a discharge flow path 218.

The room 201 is arranged outside the room 203.

The room 202 is arranged outside the room 204.

The room 203 is arranged between the room 201 and the room 202. The room 203 can store a liquid containing ionized carbon dioxide, for example.

The room 204 is arranged between the room 202 and the room 203. The room 204 can store an electrolytic solution, for example.

The electrode 205 is arranged in the room 201. The electrode 206 is arranged in the room 202. The polarity of the electrode 205 and that of the electrode 206 change according to a device configuration. Specifically, when one of the electrode 205 and the electrode 206 is an anode, the other electrode is a cathode.

The electrode 205 and the electrode 206 can contains a metal material such as an element metal such as gold, aluminum, copper, silver, platinum, palladium, zinc, mercury, indium, nickel, or titanium, or an alloy containing the metal, and a carbon material such as graphene or carbon nanotube, for example.

The diaphragm 207 is provided between the room 201 and the room 203, and partitions between the room 201 and the room 203.

The diaphragm 208 is provided between the room 202 and the room 204, and partitions between the room 202 and the room 204.

The diaphragm 209 is provided between the room 203 and the room 204, and partitions between the room 203 and the room 204.

Examples of each of the diaphragms 207, 208, and 209, include a cation exchange membrane, an anion exchange membrane, or a bipolar membrane made by bonding the cation exchange membrane and the anion exchange membrane. Positions and types of the diaphragms decide a direction of polarity when supplying a current between the electrode 205 and the electrode 206 from the current regulator 52, and whether each of a carbon dioxide regenerant and an alkali regenerant to be discharged corresponds to which of the discharge flow path 212 and the discharge flow path 214.

The supply flow path 211 is connected to the room 201. The electrodialysis cell 200 can supply the electrolytic solution to the room 201 from the electrolytic solution tank 93 through the supply flow path 211, by using the pump 63.

The discharge flow path 212 is connected to the room 201. The electrodialysis cell 200 can discharge a fluid containing a gas generated in the room 201 and the first electrolytic solution or the second electrolytic solution, from the room 201.

The supply flow path 213 is connected to the room 202. The electrodialysis cell 200 can supply the electrolytic solution to the room 202 from the electrolytic solution tank 93 through the supply flow path 213, by using the pump 64.

The discharge flow path 214 is connected to the room 202. The electrodialysis cell 200 can discharge a fluid containing a gas generated in the room 202 and the first electrolytic solution or the second electrolytic solution, from the room 202.

The supply flow path 215 is connected to the room 203. The supply flow path 215 may also be connected to the gas/liquid separator 31. The electrodialysis cell 200 can supply an anode drain separated from a fluid containing a reactive gas and the second electrolytic solution and discharged from the discharge flow path 108, to the room 203 through the supply flow path 215.

The discharge flow path 216 is connected to the room 203. The discharge flow path 216 may also be connected to the gas/liquid separator 32. The electrodialysis cell 200 can discharge a fluid containing a gas and a liquid from the room 203 through the discharge flow path 216.

The supply flow path 217 is connected to the room 204. The supply flow path 217 may also be connected to the gas/liquid separator 32. The electrodialysis cell 200 can supply a liquid separated by the gas/liquid separator 32, as a circulating solution, into the room 204 through the supply flow path 217.

The discharge flow path 218 is connected to the room 204. The discharge flow path 218 may also be connected to the pump 61. The electrodialysis cell 200 can discharge a fluid containing a gas and a liquid through the discharge flow path 218.

The electrodialysis cell 200 may also have a structure, as illustrated in FIG. 4, in which a configuration unit including the room 203, the room 204, the diaphragm 207, the diaphragm 209, the supply flow path 215, the discharge flow path 216, the supply flow path 217, and the discharge flow path 218, is set to a cell configuration unit U, and a plurality of the cell configuration units U are arranged side by side by being sandwiched between the room 201 and the room 202. In the structure illustrated in FIG. 4, it is also possible to use the diaphragm 208 instead of the diaphragm 207 included in the cell configuration unit U, in order to create a symmetrical state. Further, a positional relationship between the room 203 and the room 204 may be reversed depending on a combination of the diaphragms and a sign of a voltage to be applied to the electrodes.

The gas/liquid separator 31 is arranged at a subsequent stage of the carbon dioxide electrolysis cell 100. The gas/liquid separator 31 separates the fluid discharged from the anode flow path 102 of the carbon dioxide electrolysis cell 100 into a first liquid (anode drain) and a first gas (anode exhaust). The gas/liquid separator 31 has a gas/liquid separation membrane, for example.

The gas/liquid separator 32 is arranged at a subsequent stage of the electrodialysis cell 200. The gas/liquid separator 32 separates the fluid discharged from the discharge flow path 216 of the electrodialysis cell 200 into a second liquid and a second gas. The gas/liquid separator 32 has a gas/liquid separation membrane, for example.

The carbon dioxide detector 41 can detect a concentration of carbon dioxide contained in the fluid discharged from the cathode flow path 101 of the carbon dioxide electrolysis cell 100. By changing the flow rate of carbon dioxide to be supplied to the cathode flow path 101 of the carbon dioxide electrolysis cell 100 in accordance with the concentration of carbon dioxide measured by the carbon dioxide detector 41, the concentration of carbon dioxide in the fluid discharged from the cathode flow path 101 may be regulated to an optimum value. Consequently, a mechanism or a process of regulating the concentration of carbon dioxide in the fluid discharged from the cathode flow path 101 can be simplified or eliminated, resulting in that the cost for the carbon dioxide electrolytic device 1 and a valuable material manufacturing system can be reduced.

The carbon dioxide detector 42 can detect a concentration of carbon dioxide contained in the fluid discharged from the room 203 of the electrodialysis cell 200.

Examples of each of the carbon dioxide detector 41 and the carbon dioxide detector 42, include a carbon dioxide concentration meter which employs a system of gas chromatography (GC), specific heat, IR absorption, or the like.

The pH/ion concentration detector 43 can detect a pH of the fluid discharged from the anode flow path 102 of the carbon dioxide electrolysis cell 100, or at least one kind of ion contained in the fluid. The pH/ion concentration detector 43 may also be connected to a subsequent stage of the discharge flow path 110 or the gas/liquid separator 31.

The water quality detector 44 can monitor the water quality of the anode drain by detecting a concentration of at least one component contained in the anode drain separated by the gas/liquid separator 31. A detection system of the water quality detector 44 may be a system in which a part of the liquid is batched off and analyzed by a liquid chromatography, or a system in which a specific compound is detected. The water quality detector 44 may be connected to a subsequent stage of the gas/liquid separator 31, or it may also be connected to the front and the rear of the pump 61.

The current regulator 51 is connected to the carbon dioxide electrolysis cell 100. The current regulator 51 can supply a first current between the cathode 104 and the anode 105 of the carbon dioxide electrolysis cell 100.

The current regulator 52 is connected to the electrodialysis cell 200. The current regulator 52 can supply a second current between the electrode 205 and the electrode 206 of the electrodialysis cell 200.

The current regulator 51 and the current regulator 52 may have, for example, other than an AC power supply supplied from a power station and a DC power supply via a converter circuit, a variable power supply, namely, a power supply that supplies electric energy obtained by converting renewable energy. Examples of such power supply include a power supply that converts kinetic energy or potential energy of wind power, water power, geothermal power, tidal power or the like into electric energy, a power supply such as a solar cell including a photoelectric conversion element that converts light energy into electric energy, a power supply such as a fuel cell or a storage battery that converts chemical energy into electric energy, a device that converts vibrational energy such as sound into electric energy, and so on. Further, the current regulator 51 and the current regulator 52 may also have a power controller which controls the aforementioned power supplies.

The pump 61 is arranged at a subsequent stage of the electrodialysis cell 200. The pump 61 can supply the fluid discharged from the room 204 to the anode flow path 102 of the carbon dioxide electrolysis cell 100.

The purge valve 62 is arranged at a subsequent stage of the electrodialysis cell 200. The purge valve 62 can supply the first electrolytic solution from an electrolytic solution path 92, or it can discharge a part of the anode drain.

The purge valve 62 may be connected to a subsequent stage of the gas/liquid separator 31, or it may also be connected to the front and the rear of the pump 61.

The pump 63 is arranged in the middle of the supply flow path 211, for example. The pump 63 can supply, to the room 201, an electrolytic solution after removing a gas therefrom, from the electrolytic solution tank 93.

The pump 64 is arranged in the middle of the supply flow path 213, for example. The pump 64 can supply, to the room 202, an electrolytic solution after removing a gas therefrom, from the electrolytic solution tank 93.

The carbon dioxide supply source 71 can store carbon dioxide which is to be supplied to the cathode flow path 101 of the carbon dioxide electrolysis cell 100.

The carbon dioxide flow rate regulator 72 is provided between the carbon dioxide supply source 71 and the carbon dioxide electrolysis cell 100. The carbon dioxide flow rate regulator 72 uses a mass flow controller or the like to regulate a flow rate of the fluid containing carbon dioxide which is to be supplied to the cathode flow path 101. By increasing/decreasing, with the use of the carbon dioxide flow rate regulator 72, the amount of carbon dioxide to be supplied to the cathode flow path 101, it is possible to regulate a concentration of unreacted carbon dioxide in the fluid discharged from the cathode flow path 101, resulting in that a carbon dioxide utilization ratio can be improved and the concentration of carbon dioxide in the produced gas can be stabilized.

The controller 81 is connected to each of the carbon dioxide detector 41, the water quality detector 44, the purge valve 62, and the carbon dioxide flow rate regulator 72. In FIG. 1, a flow of signal in the controller 81 is indicated by a dotted line. The controller 81 uses a control signal generated in accordance with a detection signal from the carbon dioxide detector 41 to control the carbon dioxide flow rate regulator 72, resulting in that a flow rate of the fluid to be supplied to the cathode flow path 101 from the carbon dioxide supply source 71 can be regulated to an appropriate value. The controller 81 can control the purge valve 62 in accordance with a detection signal from the water quality detector 44, to replenish a liquid such as the electrolytic solution from the electrolytic solution path 92 or discharge the first liquid to the electrolytic solution path 92.

The controller 82 is connected to each of the carbon dioxide detector 42, the pH/ion concentration detector 43, the water quality detector 44, the current regulator 52, and the pump 61. FIG. 1 shows that a flow of signal in the controller 82 is indicated by a dotted line. The controller 82 uses a control signal generated in accordance with at least one detection signal from at least one of the carbon dioxide detector 42, the pH/ion concentration detector 43, and the water quality detector 44 to control the current regulator 52, which enables to regulate a value of the second current to be supplied to the electrodialysis cell 200, and by using the generated control signal, the pump 61 is controlled, which enables to regulate a flow rate of the fluid to be supplied to the anode flow path 102.

The electrolytic solution tank 93 can store the electrolytic solution discharged from the discharge flow path 212 and the discharge flow path 214. The electrolytic solution tank 93 may have a gas discharge part and a gas/liquid separation membrane for removing the gas from the fluid discharged from the discharge flow path 212 and the discharge flow path 214.

Next, an operation example of the carbon dioxide electrolysis cell 100 will be described. Here, a case of using an aqueous solution containing carbon dioxide as the first electrolytic solution and using an aqueous potassium hydroxide solution as the second electrolytic solution, to reduce carbon dioxide to mainly produce ethylene by using the cathode 104, and oxidize water or hydroxide ions to produce oxygen by using the anode 105 will be described.

When a voltage of a bath voltage or more is applied between the cathode 104 and the anode 105, the reduction reaction of carbon dioxide occurs in the vicinity of the cathode 104 which is brought into contact with the first electrolytic solution. As expressed in the following formula (1), carbon dioxide contained in the first electrolytic solution is reduced by electrons (e⁻) supplied from the power supply to produce ethylene ($C_2H_4$) and hydroxide ions (OH⁻). A part of the produced hydroxide ions (OH) reacts with carbon dioxide, resulting in that hydrogen carbonate ions ($HCO_3^-$) and carbonate ions ($CO_3^{2-}$) are produced (a formula (2) and a formula (3)). By the voltage between the cathode 104 and the anode 105, a part of the hydroxide ions, the hydrogen carbonate ions, and the carbonate ions moves into the second electrolytic solution through the diaphragm 103. The reduction reaction of carbon dioxide is not limited to the ethylene production reaction, and may be a production reaction of carbon monoxide, ethanol, ethane, methane, methanol, formic acid, acetic acid, propanol, or the like.

$$2CO_2 + 8H_2O + 12e^- \rightarrow C_2H_4 + 12OH^- \tag{1}$$

$$12CO_2 + 12OH^- \rightarrow 12HCO_3^- \tag{2}$$

$$HCO_3^- + OH^- \leftrightarrow CO_3^{2-} + H_2O \tag{3}$$

The vicinity of the anode 105 on the second electrolytic solution oxidizes the water. As expressed in the following formula (4), the oxidation reaction of $H_2O$ contained in the second electrolytic solution occurs, and electrons are lost and oxygen ($O_2$) and hydrogen ions ($H^+$) are produced.

$$6H_2O \rightarrow 12H^+ + 3O_2 + 12e^- \tag{4}$$

The produced hydrogen ions ($H^+$) are neutralized with the second electrolytic solution, to decide the pH in the vicinity of the anode 105. Through an equilibrium reaction in a formula (5) according to the pH in the vicinity of the anode 105, the hydrogen carbonate ions ($HCO_3^-$) or the carbonate ions ($CO_3^{2-}$) moved through the diaphragm 103 are discharged in a state of being dissolved as they are as a liquid or in a form of carbon dioxide, together with the generated oxygen, from the discharge flow path 110. In the equilibrium reaction in the formula (5), as the pH becomes higher (closer to alkaline), the equilibrium shifts further to the right.

$$CO_2+H_2O \leftarrow \rightarrow HCO_3^- + H^+ \leftarrow \rightarrow CO_3^{2-} + 2H^+ \qquad (5)$$

When the hydroxide ions are produced in the cathode 104 as described above, the larger the amount of current to be supplied is, the more the hydroxide ions are generated, and a large amount of carbon dioxide is dissolved in the first electrolytic solution to move to the anode 105 side. Specifically, as the amount of current becomes large, a larger amount of carbon dioxide is not used for the carbon dioxide reduction reaction, and thus the carbon dioxide utilization ratio is reduced. Further, it can be considered that a phenomenon in which a part of carbon dioxide supplied to the cathode 104 side is dissolved in the electrolytic solution, and passed through the diaphragm 103 to move to the anode 105 (crossover) occurs.

In the carbon dioxide electrolytic device 1, carbon dioxide moved to the anode 105 side as it is in a state of gas or as the hydrogen carbonate ions or the carbonate ions is regenerated to the carbon dioxide gas in the electrodialysis cell 200, and supplied again to the carbon dioxide electrolysis cell 100, to thereby improve the carbon dioxide utilization ratio as a whole device.

Known examples of a method of recovering carbon dioxide which is not used for the carbon dioxide reduction reaction, include a method of absorbing the carbon dioxide gas be a scrubber to regenerate the absorbed gas in an electrodialysis cell. On the contrary, the carbon dioxide electrolytic device 1 can regenerate the carbon dioxide gas without using the scrubber.

The electrodialysis cell 200 is to dissolve the carbon dioxide gas moved to the anode 105 side in the solution as the carbonate ions or the hydrogen carbonate ions through the equilibrium reaction in the formula (5), in order to regenerate the carbonate ions or the hydrogen carbonate ions dissolved in the second electrolytic solution to carbon dioxide. This is to regulate the pH of the fluid in the vicinity of the anode 105 to shift the equilibrium reaction in the formula (5) to the right. The pH of the fluid in the vicinity of the anode 105 is decided by the flow rate of the fluid to be supplied to the anode flow path 102 from the pump 61 connected to the supply flow path 109, and the pH of the second electrolytic solution before passing through the anode flow path 102 and the amount of supply current to the carbon dioxide electrolysis cell 100.

The pH of the fluid in the vicinity of the anode 105 which causes the equilibrium reaction in the formula (5) is measured by the pH/ion concentration detector 43.

When, in the equilibrium reaction in the formula (5), the pH is lower than that at which carbon dioxide exists as the hydrogen carbonate ions or the carbonate ions, namely, when carbon dioxide moved to the anode 105 side is not completely dissolved in the solution, it is possible to regulate the pH to one at which the most part of carbon dioxide moved to the anode 105 side exists as the hydrogen carbonate ions or the carbonate ions, in accordance with the flow rate of the fluid to be supplied to the anode flow path 102 from the pump 61, or the amount of current to be supplied to the electrodialysis cell 200, namely, the pH of the second electrolytic solution before passing through the anode flow path 102. When the pH is about 8.35 or more, the most part of carbon dioxide in the aqueous solution exists as the hydrogen carbonate ions or the carbonate ions, so that it can be considered to perform control to make the pH measured by the pH/ion concentration detector 43 to be 8.35 or more.

The fluid of gas/liquid two-phase flow discharged from the discharge flow path 110 is separated by the gas/liquid separator 31 into the anode exhaust and the anode drain, in which the anode exhaust is recovered or discarded through a gas exhaust path 91 connected to the gas/liquid separator 31, and the anode drain is supplied to the room 203 of the electrodialysis cell 200 through the supply flow path 215 connected to the gas/liquid separator 31.

Examples of the anode exhaust include, other than oxygen and carbon dioxide, a mixed gas in which a gas product such as carbon monoxide or ethylene produced through the carbon dioxide reduction reaction is moved to the anode 105 side through the diaphragm 103 and mixed, and the like. Regarding the anode exhaust, a gas component thereof is measured by the carbon dioxide detector 42, and when a concentration of carbon dioxide reaches a certain level or more, by regulating the flow rate of the pump 61 or the amount of current to be supplied to the electrodialysis cell 200, it is possible to control the pH of the electrolytic solution so as to make carbon dioxide contained in the anode exhaust to be dissolved in the anode drain. In terms of secondary usage of the oxygen gas produced in the anode 105 as well, the anode exhaust discharged from the gas exhaust path 91 is desirably the oxygen gas with high purity, and it can be considered to be used also as an inhalation gas and a reaction gas.

Regarding the anode drain separated by the gas/liquid separator 31, a component thereof is measured by the water quality detector 44. There is a possibility that a liquid product such as methanol, ethanol, or formic acid which may be produced through the carbon dioxide reduction reaction, exerts an influence on the various electrodes and diaphragms to deteriorate their performances, so that when concentrations of these compounds exceed certain concentrations (predetermined values) in the liquid, it can be considered to perform control in which discharge and supply of liquid are carried out via the purge valve 62 so as to make the concentrations of these compounds to be the predetermined values or less. The liquid to be supplied is the aqueous solution used for the second electrolytic solution, or the ionic liquid.

To the room 203 of the electrodialysis cell 200, the anode drain is supplied from the supply flow path 215, and the gas and the liquid are discharged from the discharge flow path 216. To the room 204, the circulating solution is supplied from the supply flow path 217, and the gas and the liquid are discharged from the discharge flow path 218. In the room 203 and the room 204, the first electrolytic solution and the second electrolytic solution are stored.

When the cation exchange membrane is used for the diaphragm 209, and the bipolar membrane is used for each of the diaphragm 207 and the diaphragm 208, the electrode 205 is the anode, the electrode 206 is the cathode, the carbon dioxide regenerant is discharged through the discharge flow path 212, and the alkali regenerant is discharged through the discharge flow path 214.

When the bipolar membrane is used for the diaphragm 209, and the cation exchange membrane is used for each of the diaphragm 207 and the diaphragm 208, the electrode 205 is the cathode, the electrode 206 is the anode, the carbon dioxide regenerant is discharged through the discharge flow path 212, and the alkali regenerant is discharged through the discharge flow path 214.

When the anion exchange membrane is used for the diaphragm 209, and the bipolar membrane is used for each of the diaphragm 207 and the diaphragm 208, the electrode 205 is the cathode, the electrode 206 is the anode, the alkali regenerant is discharged through the discharge flow path 212, and the carbon dioxide regenerant is discharged through the discharge flow path 214.

When the bipolar membrane is used for the diaphragm 209, and the anion exchange membrane is used for each of the diaphragm 207 and the diaphragm 208, the electrode 205 is the anode, the electrode 206 is the cathode, the alkali regenerant is discharged through the discharge flow path 212, and the carbon dioxide regenerant is discharged through the discharge flow path 214.

By arranging the bipolar membrane on the anion exchange membrane side toward the anode, arranging it on the cation exchange membrane side toward the cathode side, and applying a positive potential to the anode with the use of the current regulator 52, cations pass through the cation exchange membrane to move to the cathode side, and anions pass through the anion exchange membrane to move to the anode side.

The carbon dioxide regenerant is separated by the gas/liquid separator 32 into the liquid containing water (second liquid) and the gas containing carbon dioxide (second gas), in which the second liquid is supplied, as the circulating solution, to the room 204 through the supply flow path 213, and the second gas is supplied to the cathode flow path 101 of the carbon dioxide electrolysis cell 100. Specifically, carbon dioxide which is dissolved in the second electrolytic solution and is not used for the carbon dioxide reduction reaction in the carbon dioxide electrolysis cell 100, is regenerated as the carbon dioxide gas in the electrodialysis cell 200, and is used for the carbon dioxide reduction reaction in the carbon dioxide electrolysis cell 100 again, resulting in that the carbon dioxide utilization ratio in the carbon dioxide reduction reaction as a whole device can be improved. The alkali regenerant is fed to the anode flow path 102 of the carbon dioxide electrolysis cell 100 as the second electrolytic solution by the pump 61 through a corresponding discharge flow path.

The bipolar membrane dissociates water into hydrogen ions (H⁺) and hydroxide ions (OH) through the following reaction formula (6), in which the hydrogen ions react with anions remaining in the room, and the hydroxide ions react with cations remaining in the room, to form products.

$$H_2O \rightarrow H^+ + OH^- \quad (6)$$

At this time, the oxidation-reduction reaction occurs in the electrode 205 and the electrode 206, in which the oxidation reaction occurs in the anode and the reduction reaction occurs in the cathode. When using the aqueous solution, there is a possibility that an oxygen production reaction mainly occurs as the oxidation reaction, a hydrogen production reaction mainly occurs as the reduction reaction, and the oxidation-reduction reaction according to the other remaining ion species occurs.

The current regulator 52 can change a value of current to be supplied to the electrodialysis cell 200. This can control rates of the water separation reaction in the bipolar membrane and the oxidation-reduction reaction in the electrodes, namely, this can regulate the concentration of carbon dioxide in the carbon dioxide regenerant and the pH of the alkali regenerant. As described above, an increase of the current value in the carbon dioxide electrolysis cell 100 decrease the pH of the second electrolytic solution, but the electrodialysis cell 200 is to keep a sufficiently high pH of the electrolytic solution, which is namely the alkali regenerant, to be supplied to the carbon dioxide electrolysis cell 100 to completely dissolve carbon dioxide into the electrolytic solution as the hydrogen carbonate ions or the carbonate ions, in order to regenerate carbon dioxide in the electrodialysis cell 200.

Each of the circulating solution and an electrode solution is pure water or an aqueous solution, and is preferably an aqueous solution made of components same as those of the second electrolytic solution. However, when the cation exchange membrane is employed, it is possible to use an aqueous solution containing ions with the same cation species and different anion species, and when the anion exchange membrane is used, it is possible to use an aqueous solution containing ions with the same anion species and different cation species. In order to reduce an influence on the diaphragm and reduce a resistance value between the electrodes, it is preferable to use an aqueous solution with low solution resistance.

Next, an explanation will be made on an operation example of the electrodialysis cell 200 when, as a result of the operation of the carbon dioxide electrolysis cell 100, the carbon dioxide electrolysis cell 100 is formed by using an aqueous solution containing potassium ions, hydrogen carbonate ions, and carbonate ions for the anode drain, a 0.02 M $KHCO_3$ aqueous solution for the circulating solution, a 1M $K_2CO_3$ aqueous solution for the electrode solution, the cation exchange membrane for the diaphragm 209, and the bipolar membrane for each of the diaphragm 207 and the diaphragm 208.

The potassium ions in the anode drain stored in the room 203 are moved to the room 204 by a voltage applied between the electrode 205 and the electrode 206, resulting in that a state of the room 203 changes to one with a large amount of the hydrogen carbonate ions and the carbonate ions, and a state of the room 204 changes to one with a large amount of the potassium ions. In the diaphragm 207 and the diaphragm 208, electric potentials cause the water separation reaction, resulting in that hydrogen ions move to the room 203, and hydroxide ions move to the room 204. As a result of this, in the room 203, the pH in the anode drain is lowered by the hydrogen ions, and the equilibrium reaction in the formula (5) shifts to the left to cause change to water and carbon dioxide. Alternatively, as in a formula (7) and a formula (8), the hydrogen ions, and the hydrogen carbonate ions or the carbonate ions react to produce water and carbon dioxide. In the room 204, as in a formula (9), the potassium ions and the hydroxide ions react to produce potassium hydroxide.

$$H^+ + HCO_3^- \rightarrow H_2O + CO_2 \quad (7)$$

$$2H^+ + CO_3^{2-} \rightarrow H_2O + CO_2 \quad (8)$$

$$K^+ + OH^- \rightarrow KOH \quad (9)$$

As a result of the water separation reaction occurred in the diaphragm 207 and the diaphragm 208, the hydroxide ions move to the room 201 and a state of the first electrolytic solution in the room 201 changes to one with a large amount of the hydroxide ions, and the hydrogen ions move to the room 202 and a state of the second electrolytic solution in the room 202 changes to one with a large amount of the hydrogen ions. In the electrode 205 that exists in the room 201 and to which the positive potential is being applied, an oxidation reaction of the hydroxide ions occurs to generate an oxygen gas, and in the electrode 206 that exists in the room 202 and to which a negative potential is being applied, a reduction reaction of the hydrogen ions occurs to generate a hydrogen gas. These generated gases are discharged through the discharge flow path 212 and the discharge flow path 214 to be discarded, or recovered and reused.

As described above, out of carbon dioxide to be supplied to the carbon dioxide electrolysis cell 100, not only carbon dioxide that is not used for the reaction and remains in the produced gas, but also carbon dioxide which is formed when carbon dioxide that dissolves in the liquid in the cathode 104 moves to the anode 105, and, in a case of using an alkali solution for the electrolytic solution, carbon dioxide which is formed when carbon dioxide is dissolved in the alkali solution, turned into a carbon dioxide gas in the anode 105, and discharged as a gas, are not used for the electrolytic reaction, which reduces the carbon dioxide utilization ratio as a whole device.

The electrolytic device in the present embodiment obtained by combining the electrodialysis cell 200 with the carbon dioxide electrolysis cell 100, monitors the concentration of carbon dioxide in the produced gas, the pH of the electrolytic solution, and the concentration of carbon dioxide in the anode exhaust, to regulate the flow rate of carbon dioxide to be supplied to the carbon dioxide electrolysis cell 100, the value of current to be supplied to the electrodialysis cell 200, and the flow rate of fluid to be supplied to the anode flow path 102 from the pump 61 in accordance with the monitored values, resulting in an improvement of the carbon dioxide utilization ratio. This device can also reduce electric power to be supplied to the electrodialysis cell.

Second Embodiment

A carbon dioxide electrolytic device in a second embodiment is different from the carbon dioxide electrolytic device in the first embodiment, in a structure of the carbon dioxide electrolysis cell 100.

Figure 5:
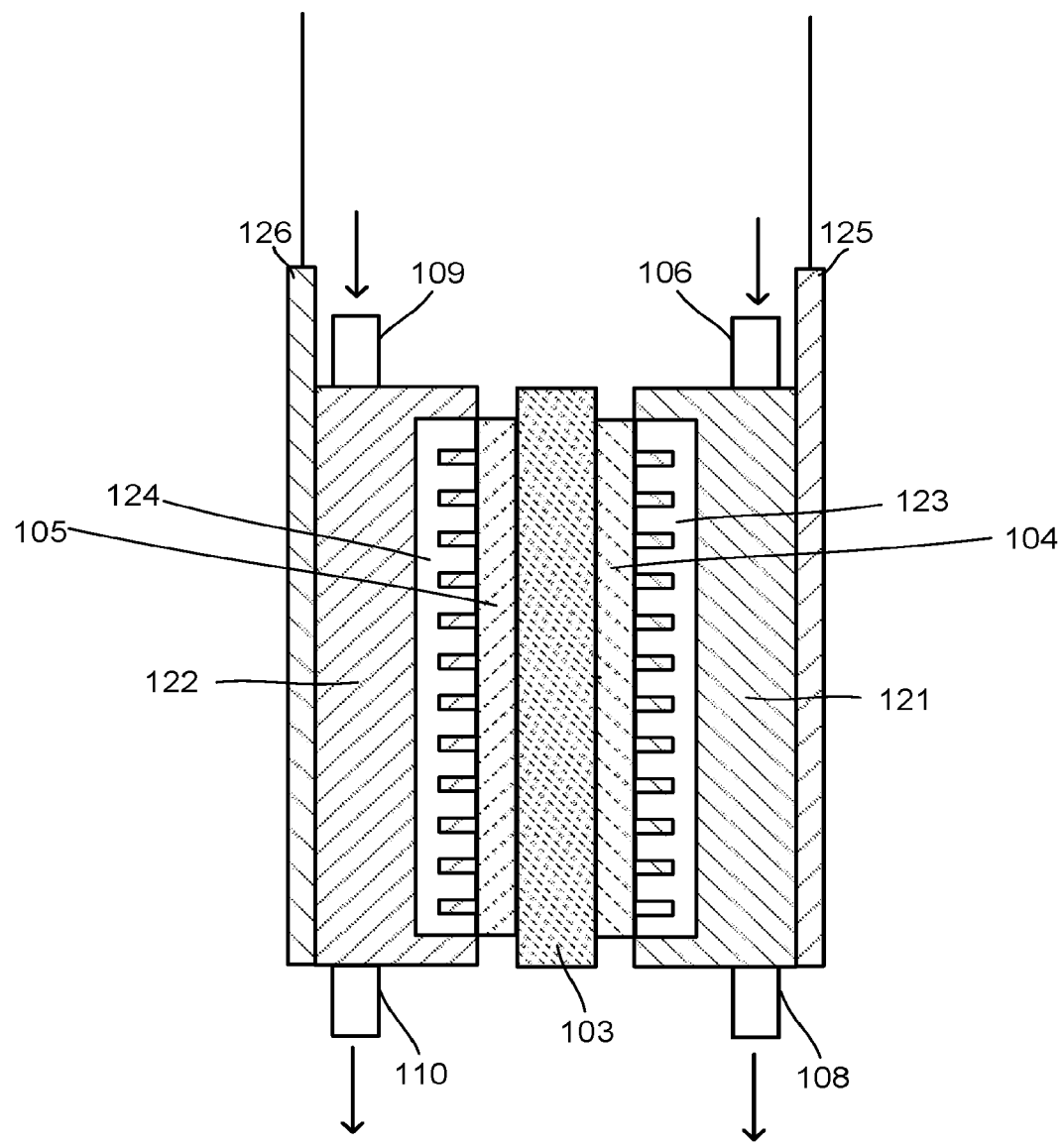
FIG. 5 is a schematic view illustrating a structural example of a carbon dioxide electrolysis cell 100 of a second embodiment.

FIG. 5 is a schematic view illustrating a structural example of a carbon dioxide electrolysis cell 100 in the second embodiment. The carbon dioxide electrolysis cell 100 illustrated in FIG. 5 has a solid polymer structure, and includes a flow path plate 121, a flow path plate 122, a diaphragm 103, a cathode 104, an anode 105, a supply flow path 106, a discharge flow path 108, a supply flow path 109, a discharge flow path 110, a current collector 125, and a current collector 126.

The flow path plate 121 forms a cathode flow path 123 including a groove facing the cathode 104. The cathode flow path 123 is connected to the supply flow path 107 and the discharge flow path 108.

The flow path plate 122 forms an anode flow path 124 including a groove facing the anode 105. The anode flow path 124 is connected to the supply flow path 109 and the discharge flow path 110.

The current collector 125 is electrically connected to the flow path plate 121 and the cathode 104. The current collector 126 is electrically connected to the flow path plate 122 and the anode 105. The current collector 125 and the current collector 126 are connected to the current regulator 52 via wirings.

The flow path plate 121, the flow path plate 122, the diaphragm 103, the cathode 104, and the anode 105 are integrated by a constant pressure.

The other explanation is the same as the explanation of the carbon dioxide electrolysis cell 100 of the first embodiment, and thus the explanation of the first embodiment can be cited appropriately.

An operation of the carbon dioxide electrolysis cell 100 may solidifying a reduction product of carbon dioxide or a component of the second electrolytic solution which moves to the cathode 104 side to block the cathode flow path 123 and thus stop the supply of gas containing carbon dioxide.

To prevent the formation of such precipitates, the gas containing carbon dioxide may preferably contain moisture.

On the other hand, an excessively large moisture amount in the gas containing carbon dioxide is not preferable, because a large amount of moisture is supplied to a surface of catalyst in the cathode 104 to promote the generation of the hydrogen. For this reason, the moisture amount in the gas containing carbon dioxide is preferably 20% or more and 90% or less, and more preferably 30% or more and 70% or less in terms of relative humidity.

The gas containing carbon dioxide is supplied to the cathode flow path 123 through the supply flow path 106, and a product produced by the cathode 104 is discharged through the discharge flow path 108. As described above, the gas containing carbon dioxide preferably contains a certain amount of moisture, a humidifier is preferably connected to the supply flow path 106 to control humidity of the supply gas. The second electrolytic solution is supplied to the anode flow path 124 through the supply flow path 109, and a product produced by the anode 105 and carbon dioxide moved from the cathode 104 are discharged, together with the second electrolytic solution, through the discharge flow path 110.

Similarly to the first embodiment, the carbon dioxide electrolytic device illustrated in FIG. 2 can dissolves carbon dioxide which is not used for the carbon dioxide reduction reaction in the carbon dioxide electrolysis cell 100 in the electrolytic solution, to improve the carbon dioxide utilization ratio as a whole device. In particular, the carbon dioxide electrolytic device can measure the concentration of carbon dioxide in the produced gas, the concentration of carbon dioxide in the anode exhaust, and the pH of the anode drain, and control the amount of carbon dioxide to be supplied to the carbon dioxide electrolysis cell 100 and the flow rate of the pump 61, resulting in the improvement of the carbon dioxide utilization ratio.

Further, the carbon dioxide electrolytic device illustrated in FIG. 2 can dissolve carbon dioxide which is not used for the carbon dioxide reduction reaction in the carbon dioxide electrolysis cell 100 in the electrolytic solution, to regenerate carbon dioxide in the electrodialysis cell 200. In particular, the carbon dioxide electrolytic device can measure the concentration of carbon dioxide in the produced gas, the concentration of carbon dioxide in the anode exhaust, and the pH of the anode drain, and control the flow rate of carbon dioxide to be supplied to the carbon dioxide electrolysis cell 100, the value of current to be supplied to the electrodialysis cell 200, and the flow rate of the fluid to be supplied to the anode flow path 102 from the pump 61, resulting in the improvement of the carbon dioxide utilization ratio.

The present embodiment can be appropriately combined with the other embodiments.

EXAMPLES

Next, Examples and their evaluation results will be described.

Examples 1 to 9

Figure 6:
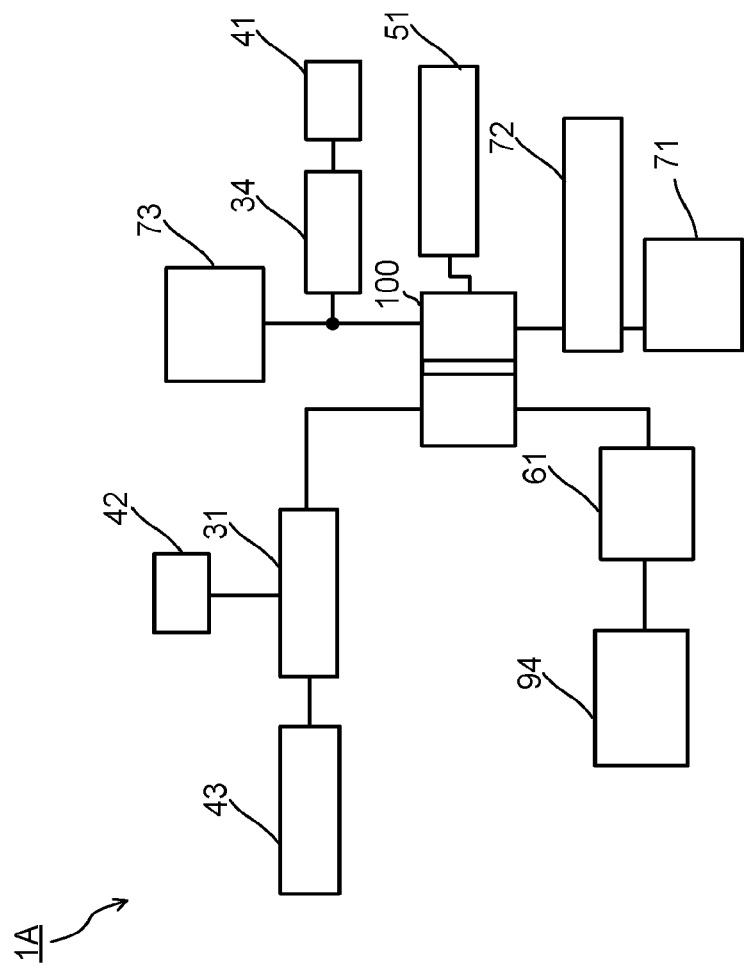
FIG. 6 is a schematic view illustrating a configuration of a carbon dioxide electrolytic device of Example.

FIG. 6 is a schematic view illustrating a structural example of a carbon dioxide electrolytic device of Example 1. A carbon dioxide electrolytic device 1A illustrated in FIG. 6 includes a carbon dioxide electrolysis cell 100, a carbon dioxide detector 41, a carbon dioxide detector 42, a gas/liquid separator 31, a flowmeter 34, a pH/ion concentration detector 43, a current regulator 51, a pump 61, a carbon dioxide supply source 71, a carbon dioxide flow rate regulator 72, an argon supply source 73, and an electrolytic solution supply source 94.

The carbon dioxide electrolysis cell 100 has a configuration illustrated in FIG. 5. The cathode 104 is an electrode obtained by coating copper nanoparticles onto a carbon paper cut in 4 cm² square. The anode 105 is an electrode obtained by coating $IrO_2$ nanoparticles onto Ti nonwoven fabric cut in 4 cm² square. The diaphragm 103 is an anion exchange membrane. For the other explanation regarding the carbon dioxide electrolysis cell 100, the explanation of FIG. 1 can be cited appropriately.

The carbon dioxide detector 41 is connected to the discharge flow path 108 of the carbon dioxide electrolysis cell 100 via the flowmeter 34. The carbon dioxide detector 41 is a gas chromatograph. For the other explanation regarding the carbon dioxide detector 41, the explanation of FIG. 1 can be cited appropriately.

The carbon dioxide detector 42 is connected to the gas/liquid separator 31. The carbon dioxide detector 42 is a gas chromatograph. For the other explanation regarding the carbon dioxide detector 42, the explanation of FIG. 1 can be cited appropriately.

The pH/ion concentration detector 43 is connected to the gas/liquid separator 31. The pH/ion concentration detector 43 is a pH sensor.

The current regulator 51 has a galvanostat. The galvanostat was applied a constant current to the carbon dioxide electrolysis cell 100. For the other explanation regarding the current regulator 51, the explanation of FIG. 1 can be cited appropriately.

The pump 61 is provided for the purpose of supplying the electrolytic solution supplied from the electrolytic solution supply source 94 to the supply flow path 109 of the carbon dioxide electrolysis cell 100. For the other explanation regarding the pump 61, the explanation of FIG. 1 can be cited appropriately.

The carbon dioxide supply source 71 has a carbon dioxide tank which stores the carbon dioxide gas. The carbon dioxide supply source 71 may also have a pump for supplying carbon dioxide.

The carbon dioxide flow rate regulator 72 is a mass flow controller.

The argon supply source 73 has an argon tank which stores the argon gas. The argon supply source 73 may also have a pump for supplying argon.

The electrolytic solution supply source 94 has an electrolytic solution tank which stores the electrolytic solution.

The carbon dioxide electrolytic device 1A was used to examine the pH and the flow rate of the electrolytic solution required for realizing that carbon dioxide exists in the electrolytic solution in a state of being dissolved as hydrogen carbonate ions or carbonate ions. The galvanostat was used for the current regulator, and a constant current was applied to the carbon dioxide electrolysis cell 100.

The carbon dioxide electrolytic device 1A was operated under the following conditions. The carbon dioxide gas with purity of greater than 99.9% was introduced at a predetermined flow rate into the cathode flow path 123. The produced gas discharged from the cathode flow path 123 was diluted 10 times by the argon gas, and then introduced into the carbon dioxide detector 41. The electrolytic solution was introduced at a predetermined flow rate from the electrolytic solution supply source 94 into the anode flow path 124. The galvanostat was applied voltages between the cathode 104 and the anode 105 of the carbon dioxide electrolysis cell 100 while changing conditions to make current densities to be 0 mA/cm², 50 mA/cm², 100 mA/cm², 200 mA/cm², and 300 mA/cm², and for each current value, the component of the produced gas, the component of the anode exhaust gas discharged from the gas/liquid separator 31, and the pH of the anode drain discharged from the gas/liquid separator 31 after a given length of time were measured by the pH/ion concentration detector 43. As the electrolytic solutions, a 0.1 M aqueous potassium hydroxide solution, a 0.1 M aqueous potassium carbonate solution, and a 0.1 M aqueous potassium hydrogen carbonate solution were used, and the measurement was conducted while changing the flow rate of carbon dioxide to 20 mL/min and 40 mL/min, and changing the flow rate of electrolytic solution to 5 mL/min and 10 mL/min. The conditions in the respective Examples are as indicated in Table 1.

TABLE 1

| | Type of electrolytic solution | Flow rate of electrolytic solution | Flow rate of carbon dioxide |
|---|---|---|---|
| Example 1 | $KHCO_3$ | 10 mL/min | 40 mL/min |
| Example 2 | $K_2CO_3$ | 10 mL/min | 40 mL/min |
| Example 3 | KOH | 10 mL/min | 40 mL/min |
| Example 4 | $KHCO_3$ | 5 mL/min | 40 mL/min |
| Example 5 | $K_2CO_3$ | 5 mL/min | 40 mL/min |
| Example 6 | KOH | 5 mL/min | 40 mL/min |
| Example 7 | $KHCO_3$ | 10 mL/min | 20 mL/min |
| Example 8 | $K_2CO_3$ | 10 mL/min | 20 mL/min |
| Example 9 | KOH | 10 mL/min | 20 mL/min |

Figure 7:
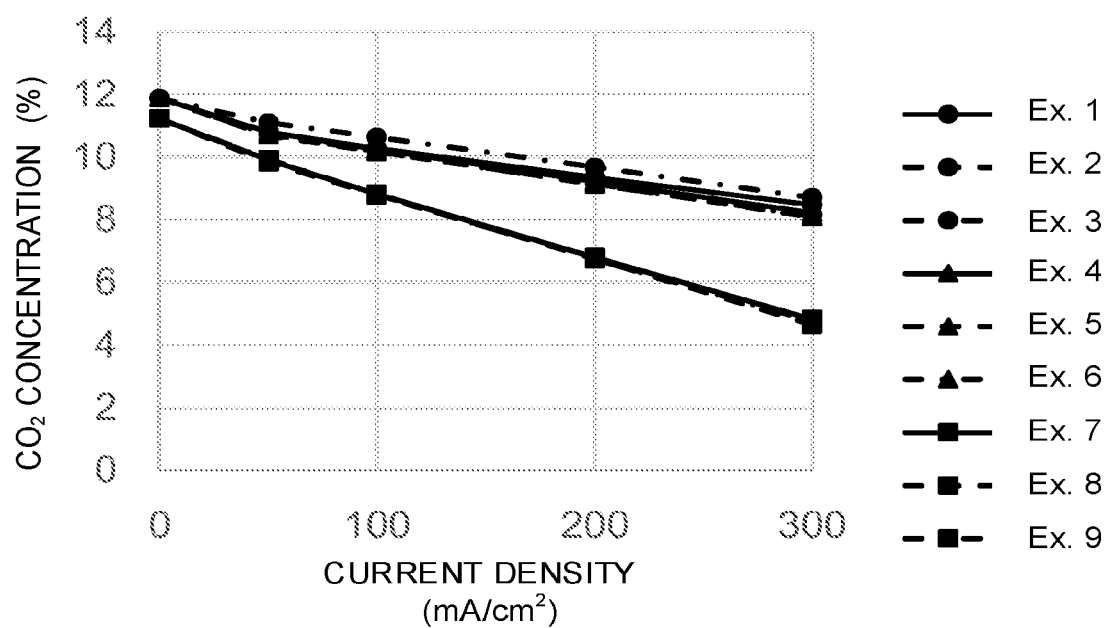
FIG. 7 is a view illustrating a concentration of carbon dioxide in a produced gas at each current density.

FIG. 7 is a view illustrating a concentration of carbon dioxide in a produced gas at each current density. A value at the current density of 0 mA/cm² indicates a concentration measured by applying no current, and a mass concentration of the produced gas is about 10% because the produced gas passed through the carbon dioxide electrolysis cell 100 is diluted 10 times by argon and then subjected to GC measurement. A plot indicated by circle marker shows a result when the flow rate of carbon dioxide is 40 mL/min and the flow rate of electrolytic solution is 10 mL/min, a plot indicated by triangle marker shows a result when the flow rate of carbon dioxide is 40 mL/min and the flow rate of electrolytic solution is 5 mL/min, and a plot indicated by rectangle marker shows a result when the flow rate of carbon dioxide is 20 mL/min and the flow rate of electrolytic solution is 10 mL/min. Each of the results reveals that, as the current density becomes larger, the amount of carbon dioxide used for the carbon dioxide electrolytic reaction is increased, and the concentration of carbon dioxide in the produced gas is reduced. When the flow rate of carbon dioxide is reduced, the concentration of carbon dioxide in the produced gas is relatively reduced, and thus it can be understood that the control to an optimum carbon dioxide supply amount in accordance with the current density, can control the amount of carbon dioxide in the produced gas.

Figure 8:
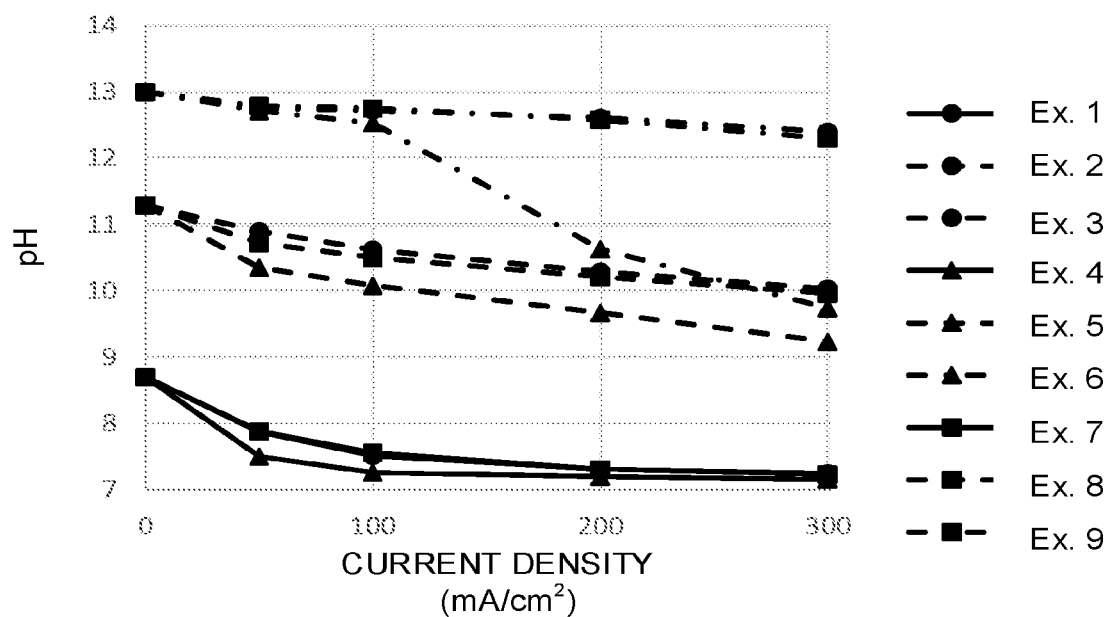
FIG. 8 is a view illustrating a pH of an electrolytic solution after passing through an anode flow path 102, at each current density.

FIG. 8 is a view illustrating a pH of the electrolytic solution after passing through the anode flow path 102, at each current density. A value at the current density of 0 mA/cm² indicates a pH of the electrolytic solution in the electrolytic solution tank before measurement. Measurement conditions regarding the respective plots are as described above. In each of the electrolytic solutions, the pH of the electrolytic solution was lowered as the current density was increased. This is significant when the flow rate of electrolytic solution is small, and it can be considered that this is because a period of time during which the electrolytic solution in the vicinity of the anode 105 at which hydrogen ions are generated is long. Accordingly, it can be understood that an increase of the flow rate of the pump 61 can keep the high pH of the electrolytic solution after passing through the anode 105, whereas a decrease of the flow rate lowers the pH of the electrolytic solution after passing through the anode 105.

Figure 9:
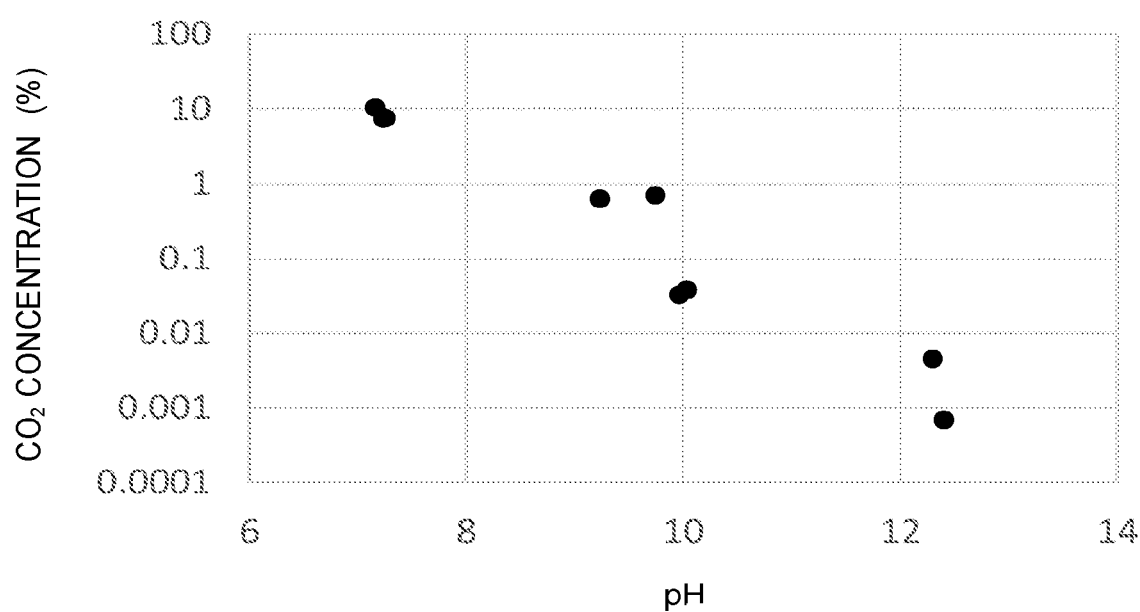
FIG. 9 is a view illustrating a relationship between a concentration of carbon dioxide in an anode exhaust and a pH of an electrolytic solution.

FIG. 9 is a view illustrating a relationship between a concentration of carbon dioxide in the anode exhaust separated by the gas/liquid separator 31 and a pH of the electrolytic solution when applying a current density of 300 mA/cm$^2$ to the carbon dioxide electrolysis cell 100. Since all the measurements are performed at the same current density, the total amount of carbon dioxide moved from the cathode flow path 101 to the anode flow path 102 is the same at each point, but it can be understood that a decrease of the pH of the electrolytic solution after passing through the carbon dioxide electrolysis cell 100, increase the amount of carbon dioxide gas, and when the pH exceeds 9, the concentration of carbon dioxide as the gas on the anode 105 side can be prevented to 1% or less. The present Example proves can control the pH of the electrolytic solution to be supplied to the carbon dioxide electrolysis cell 100, the value of current to be supplied to the electrodialysis cell 200, and the flow rate of the pump 61, to control the pH of the anode drain, and the present Example proves can control the pH of the anode drain and the amount of carbon dioxide to be introduced into the cathode 104, to reduce carbon dioxide which is not used for the reaction and exhausted as the gas. This indicates that the carbon dioxide utilization ratio of the carbon dioxide electrolytic device can be improved by the method of the present embodiment.

The above-described embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A carbon dioxide electrolytic device, comprising:
    a carbon dioxide electrolysis cell having
        a cathode flow path through which carbon dioxide flows,
        an anode flow path through which an electrolytic solution containing water flows,
        a cathode on or in the cathode flow path, the cathode being configured to reduce the carbon dioxide to produce a carbon compound,
        an anode on or in the anode flow path, the anode being configured to oxidize the water to produce oxygen, and
        a first diaphragm between the anode flow path and the cathode flow path;
    a first current regulator configured to supply a first current to the carbon dioxide electrolysis cell;
    a first gas/liquid separator configured to separate a first fluid to be discharged from the anode flow path into a first liquid and a first gas;
    an electrodialysis cell having
        a first room, a first electrode in the first room,
        a second room, a second electrode in the second room,
        a third room between the first room and the second room, the third room being configured to store the first liquid to be supplied from the first gas/liquid separator,
        a fourth room between the third room and the second room,
        a second diaphragm between the first room and the third room,
        a third diaphragm between the second room and the fourth room, and
        a fourth diaphragm between the third room and the fourth room;
    a second current regulator configured to supply a second current to the electrodialysis cell;
    at least one detector selected from the group consisting of a first detector and a second detector, the first detector being configured to detect a flow rate of the first gas or a concentration of carbon dioxide contained in the first gas, and the second detector being configured to detect a pH of the first fluid or a concentration of at least one ion contained in the first fluid; and
    a first controller configured to control the second current regulator to regulate a value of the second current, in accordance with at least one detection signal from the at least one detector.

2. The device according to claim 1, further comprising:
    a third detector configured to detect a concentration of carbon dioxide contained in the first fluid; and
    a second controller configured to control the first current regulator to regulate a value of the first current, in accordance with a detection signal from the third detector.

3. The device according to claim 2, further comprising
    a flow rate regulator configured to regulate a flow rate of a second fluid to be supplied to the cathode flow path, the second fluid containing carbon dioxide, wherein
    the second controller is configured to control the flow rate regulator to regulate the flow rate of the second fluid, in accordance with the detection signal from the third detector.

4. The device according to claim 1, further comprising
    a pump configured to supply a third fluid to be discharged from the fourth room to the anode flow path, wherein
    the first controller is configured to control the pump to regulate a flow rate of the third fluid to be supplied to the anode flow path, in accordance with the at least one detection signal from the at least one detector.

5. The device according to claim 1, further comprising
    a second gas/liquid separator configured to separate a fourth fluid to be discharged from the third room into a second liquid and a second gas, the second liquid containing the electrolytic solution, and the second gas containing the carbon dioxide, wherein:
    the second liquid is supplied to the fourth room; and
    the second gas is supplied to the cathode flow path.

6. The device according to claim 1, wherein
    the electrolytic solution contains at least one ion selected from the group consisting of a hydroxide ion, a carbonate ion, and a hydrogen carbonate ion.

7. The device according to claim 1, further comprising:
    a fourth detector is configured to detect a concentration of at least one component contained in the first liquid; and
    a purge valve configured to replenish the electrolytic solution to the first liquid or discharge a part of the first liquid, wherein
    the first controller is configured to control the purge valve to replenish the electrolytic solution or discharge a part of the first liquid so that the concentration of the at least one component contained in the first liquid is a predetermined value or less, in accordance with a detection signal from the fourth detector.

8. A method of controlling a carbon dioxide electrolytic device,
the device comprising:
   a carbon dioxide electrolysis cell having
      a cathode flow path through which carbon dioxide flows,
      an anode flow path through which an electrolytic solution containing water flows,
      a cathode on or in the cathode flow path, the cathode being configured to reduce the carbon dioxide to produce a carbon compound,
      an anode on or in the anode flow path, the anode being configured to oxidize the water to produce oxygen, and
      a first diaphragm between the anode flow path and the cathode flow path;
   a first gas/liquid separator configured to separate a first fluid to be discharged from the anode flow path into a first liquid and a first gas; and
   an electrodialysis cell having
      a first room, a first electrode in the first room,
      a second room, a second electrode in the second room,
      a third room between the first room and the second room, the third room being configured to store the first liquid to be supplied from the first gas/liquid separator,
      a fourth room between the third room and the second room,
      a second diaphragm between the first room and the third room,
      a third diaphragm between the second room and the fourth room, and
      a fourth diaphragm between the third room and the fourth room,
the method comprising:
   separating the first fluid discharged from the anode flow path into the first liquid and a first gas, and detecting at least one selected from the group consisting of a flow rate of the first gas or a concentration of carbon dioxide contained in the first gas, and a pH of the first fluid or a concentration of at least one ion contained in the first fluid; and
   regulating a value of a current to be supplied to the electrodialysis cell, in accordance with a result of the at least one detection.

* * * * *